United States Patent [19]
Looker et al.

[11] 3,709,231
[45] Jan. 9, 1973

[54] MULTI-BEATER THRESHER

[75] Inventors: Olin L. Looker, Milford; Frederick A. Zemke, Hoopeston; David R. Knicely, Rossville; Russell V. Rouse; Larry L. Slates, both of Hoopeston, all of Ill.

[73] Assignee: FMC Corporation, San Jose, Calif.

[22] Filed: May 10, 1971

[21] Appl. No.: 141,900

[52] U.S. Cl. ............................................. 130/30 H
[51] Int. Cl. ..................................................... A01d
[58] Field of Search ... 130/30 R, 30 H; 209/298, 299, 209/293, 294, 296

[56] References Cited

UNITED STATES PATENTS 2,934,072   4/1960   Mather et al. ..................... 130/30 H
1,762,225   6/1930   Hamachek .......................... 130/30 H Primary Examiner—Antonio F. Guida
Attorney—F. W. Anderson and C. E. Tripp

[57] ABSTRACT

A legume harvester has a large rotating screen and a central beater and four satellite beaters. An upfeed stripper beater receives material from the upfeed side of the screen and a control beater beneath receives material from the upfeed stripper. The control beater flings the material to the central beater which in turn flings it to the screen for sieving. A downfeed stripper beater strips material from the screen and flings it back to the central beater. In one embodiment a sieving beater receives the material from the central beater and flings it to a lower portion of the screen for sieving. In another embodiment the central beater flings the material against the screen for sieving. Then, a second downfeed stripper beater strips the material from the screen and returns it to the central beater which flings it to a lower portion of the screen for sieving. A smaller diameter screen version employs only three satellite beaters.

19 Claims, 23 Drawing Figures

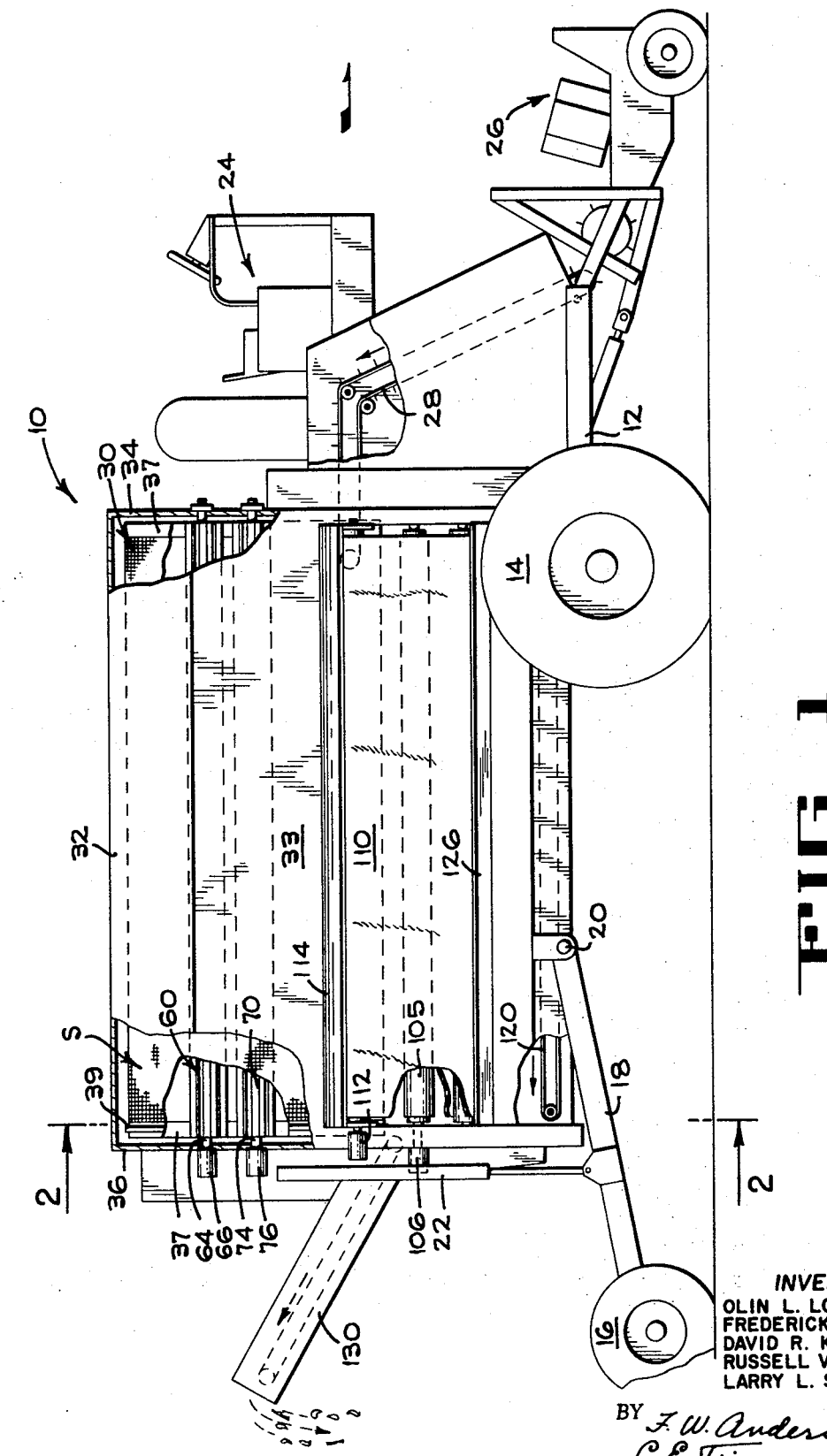
FIG_1
INVENTORS
OLIN L. LOOKER
FREDERICK A. ZEMKE
DAVID R. KNICELY
RUSSELL V. ROUSE
LARRY L. SLATES
BY F.W. Anderson
C.E. Tripp
ATTORNEYS

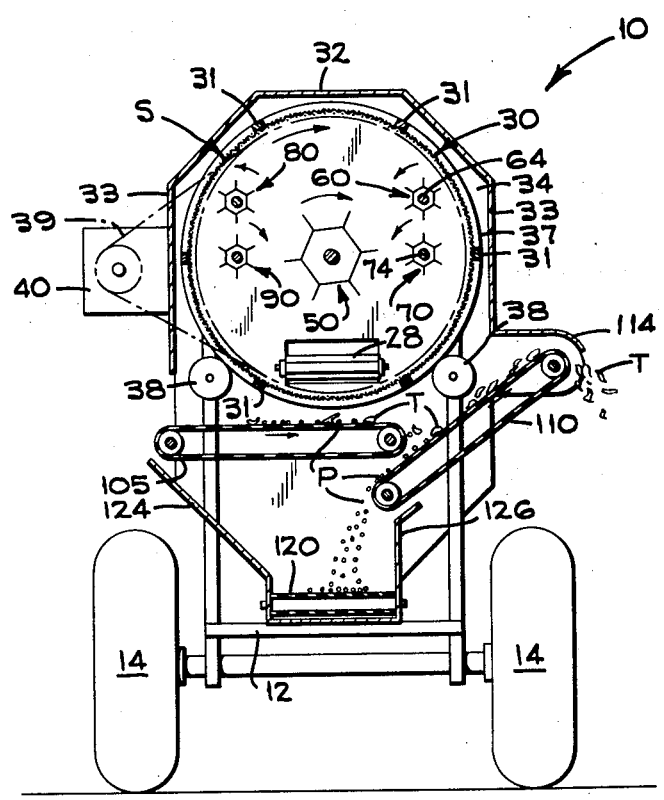
FIG_2

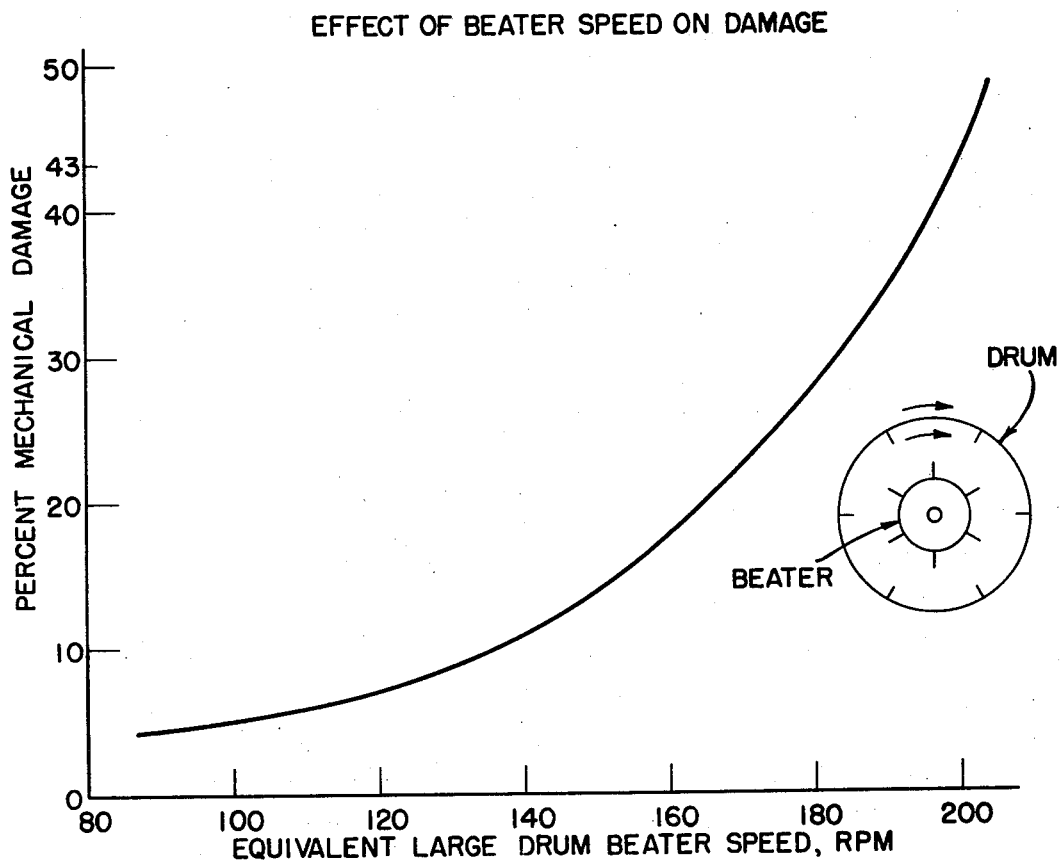
FIG_3
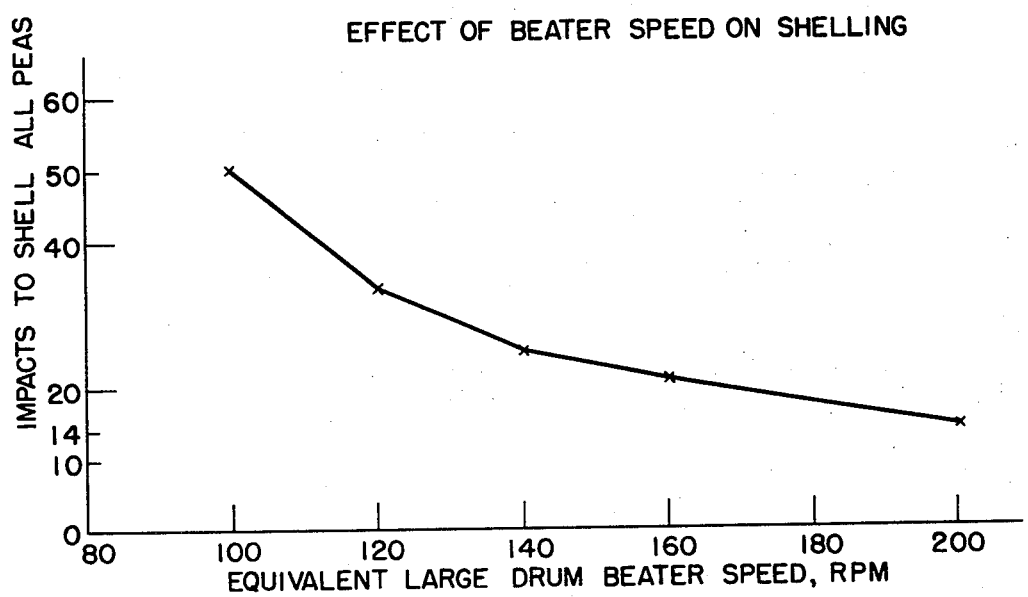
FIG_4

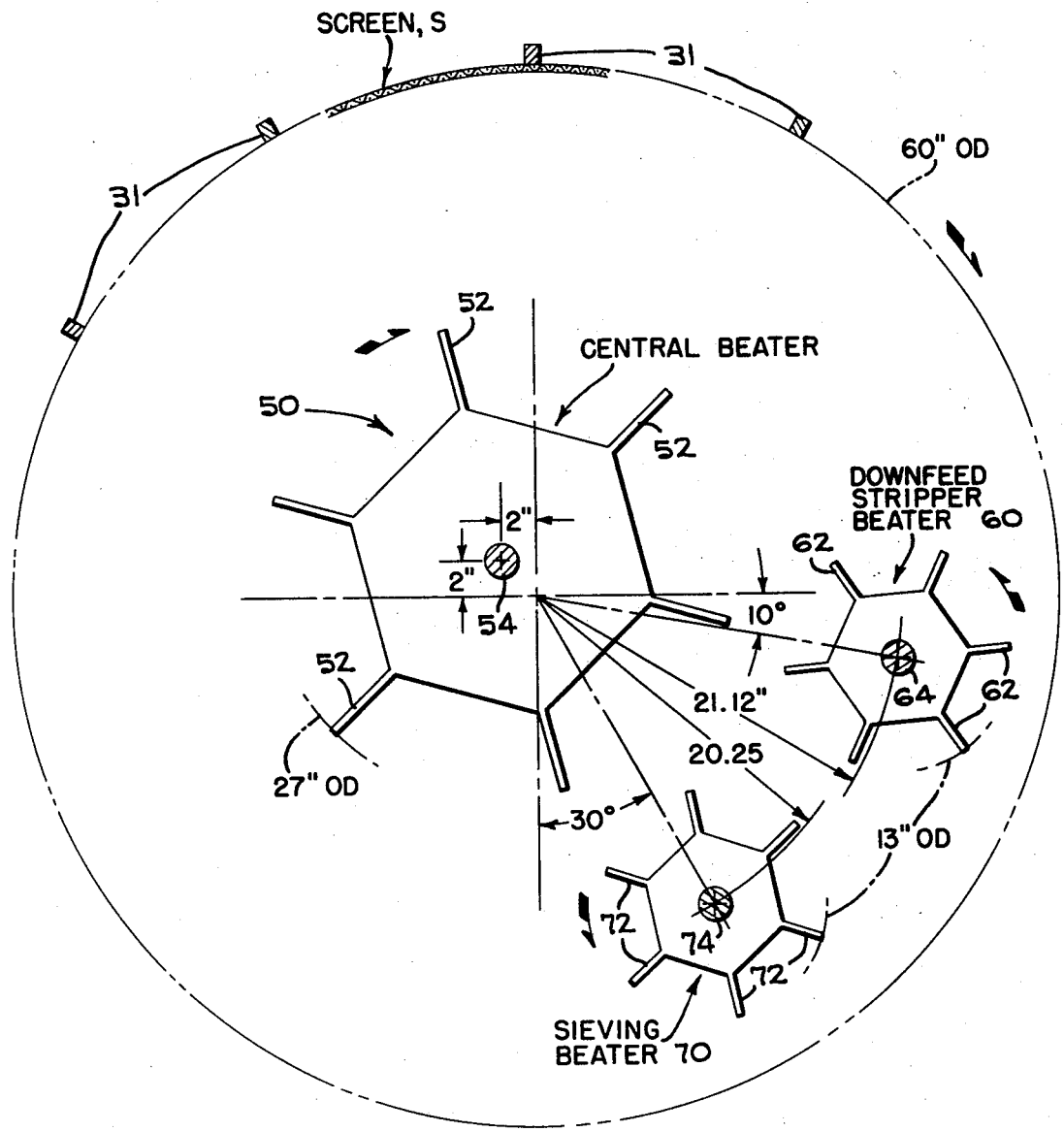

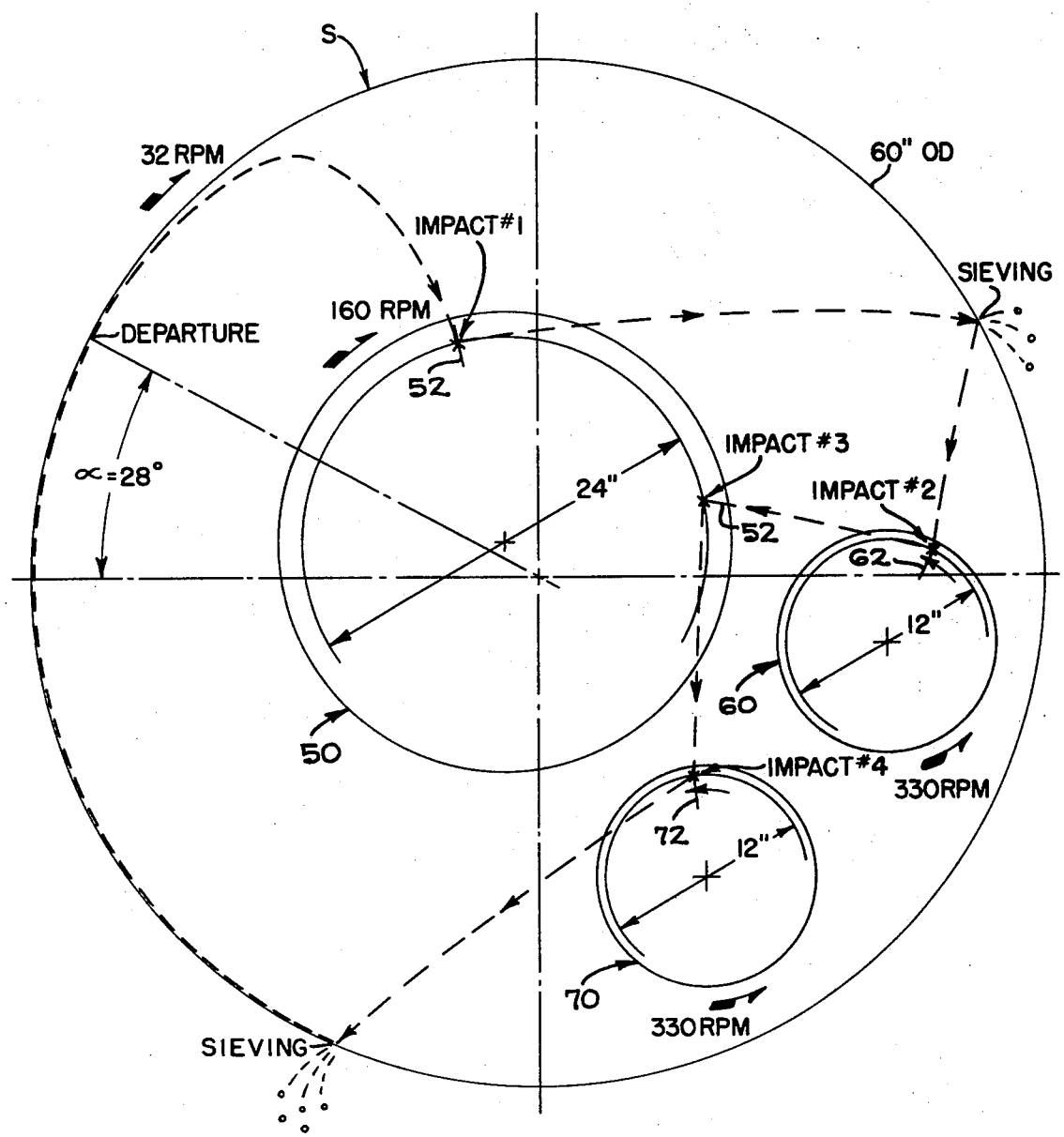

FIG_7
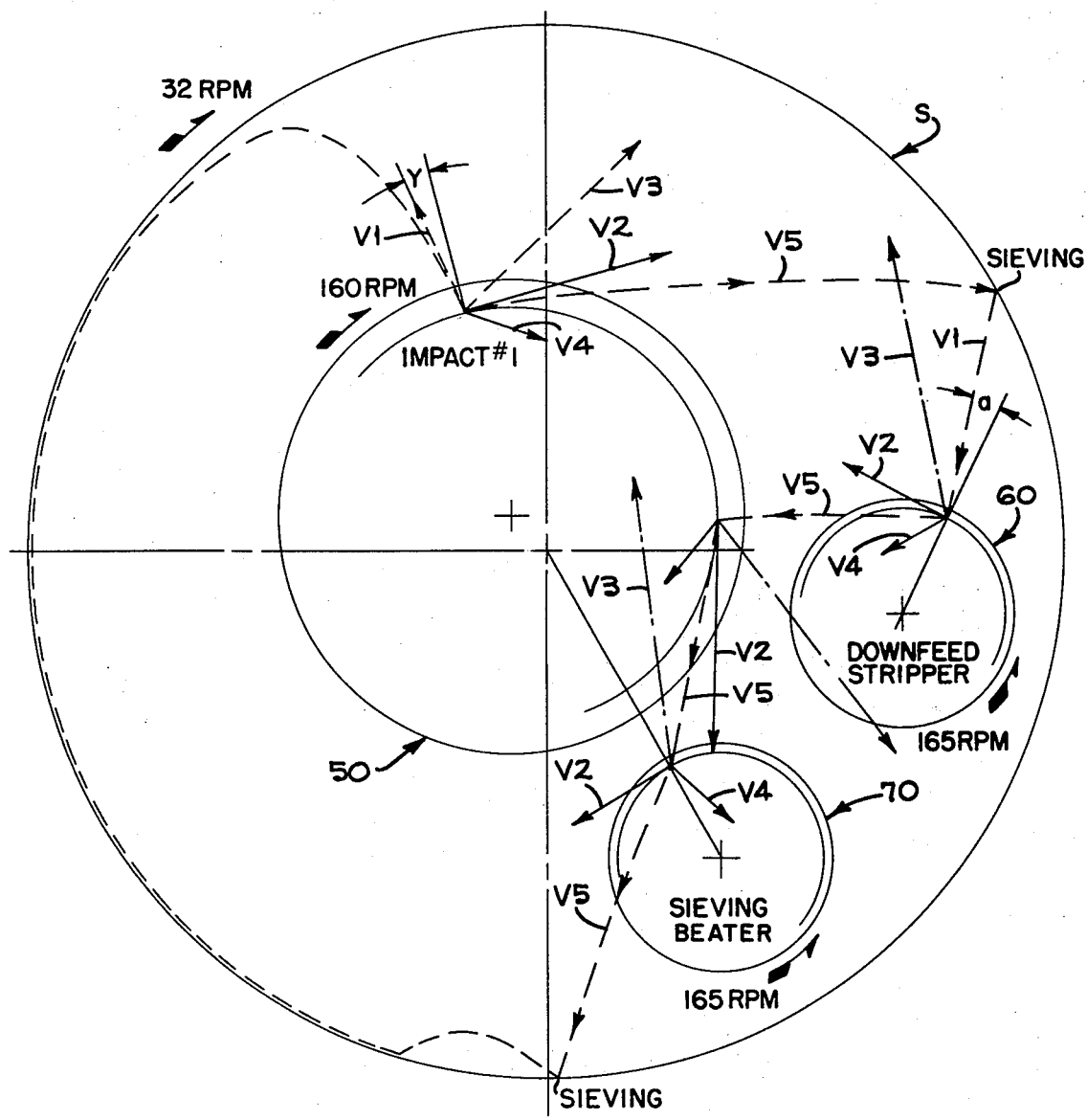
VELOCITIES WITH SATELLITE BEATER VELOCITIES $\frac{1}{2}$ CENTRAL BEATER VEL.
|                  | V1    | V2    | V3    | V5    |         |
|------------------|-------|-------|-------|-------|---------|
| CENTRAL BEATER   | 8.45  | 17.27 | 16.75 | 23.95 | FT/SEC. |
| STRIPPER BEATER  | 15.75 | 8.64  | 19.70 | 12.75 | "       |
| CENTRAL BEATER   | 12.80 | 17.27 | 20.0  | 22.70 | "       |
| SIEVING BEATER   | 24.20 | 8.64  | 19.75 | 8.70  | "       |
V1 = APPROACH VELOCITY
V2 = PADDLE SPEED AT POINT OF IMPACT
V3 = VEL. PADDLE RELATIVE TO MASS
V4 = 0.3 V3
V5 = RESULTANT VELOCITY OF MASS

FIG_7A
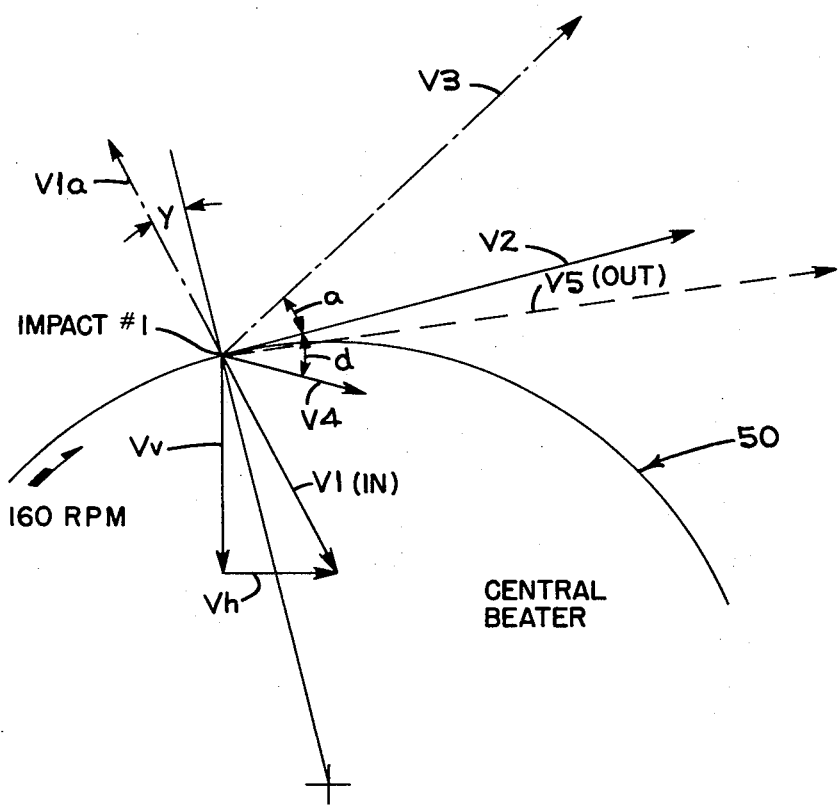
CENTRAL BEATER VECTORS
V1 = APPROACH VEL. = 8.45 FT/SEC.
Vv = VERTICAL APPROACH VEL. = 7.49 FT/SEC.
Vh = HORIZONTAL " " = 3.93 "
V1a = APPROACH VEL. REVERSED 8.45 FT/SEC.
V2 = PADDLE VEL. = 16.75 FT/SEC.
V3 = VEL. PADDLE RELATIVE TO MASS = 16.75 FT/SEC.
V4 = 0.3V3 = 5.02 FT/SEC.
V5 = RESULTANT VEL. OF MASS = 21.25 FT/SEC.

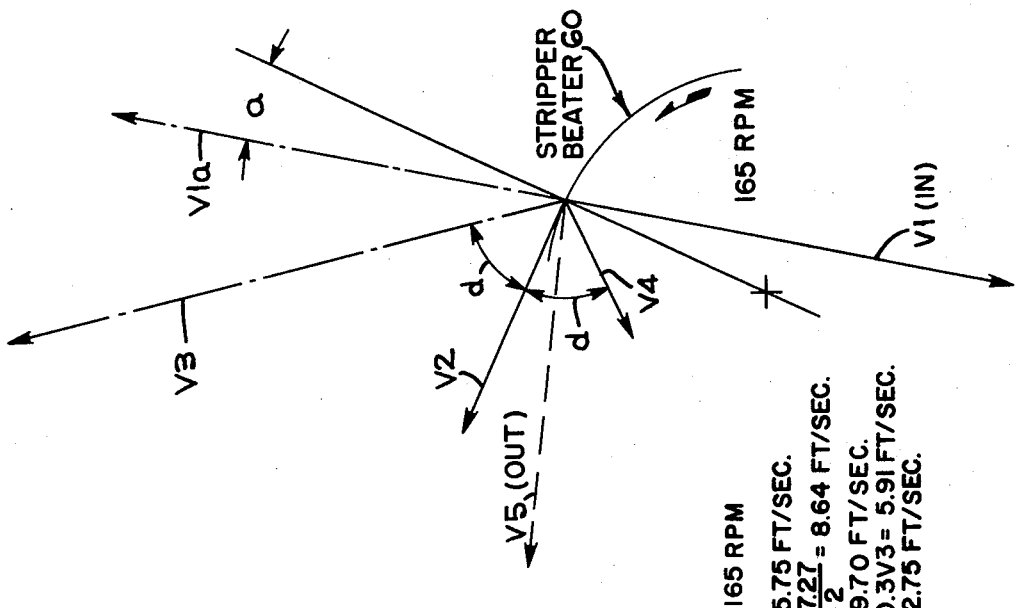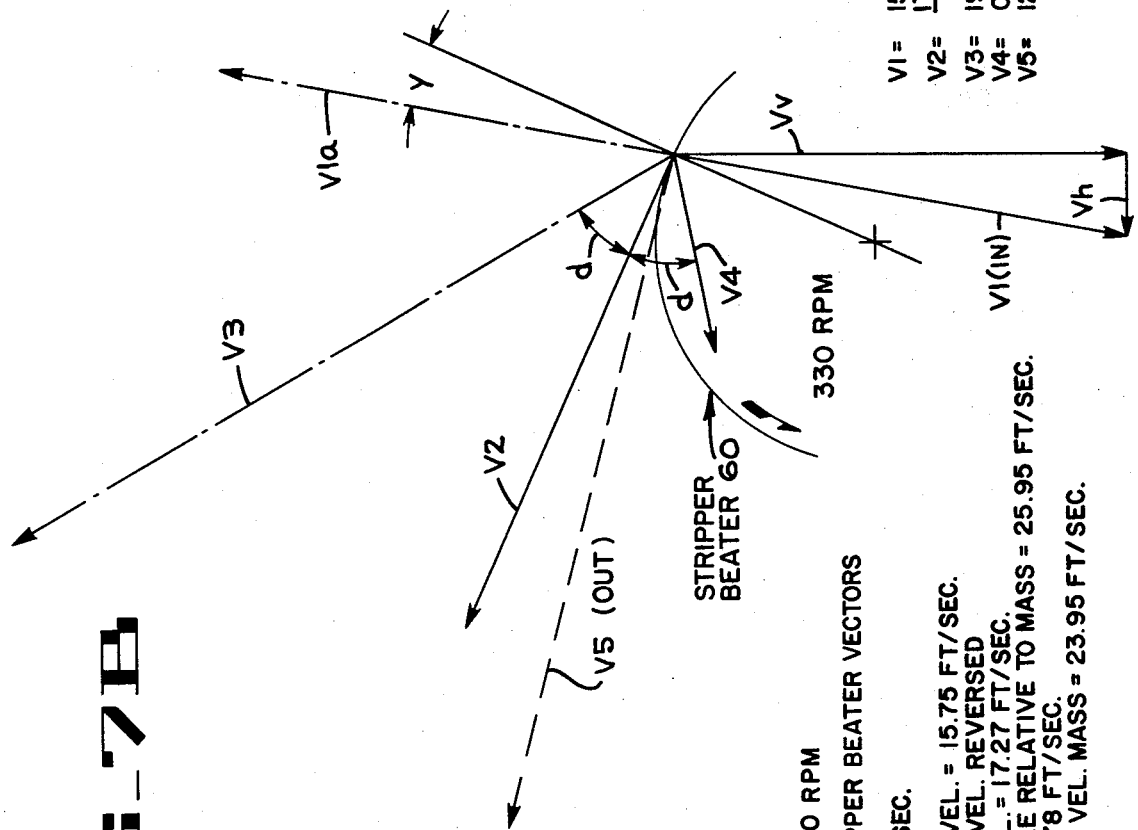

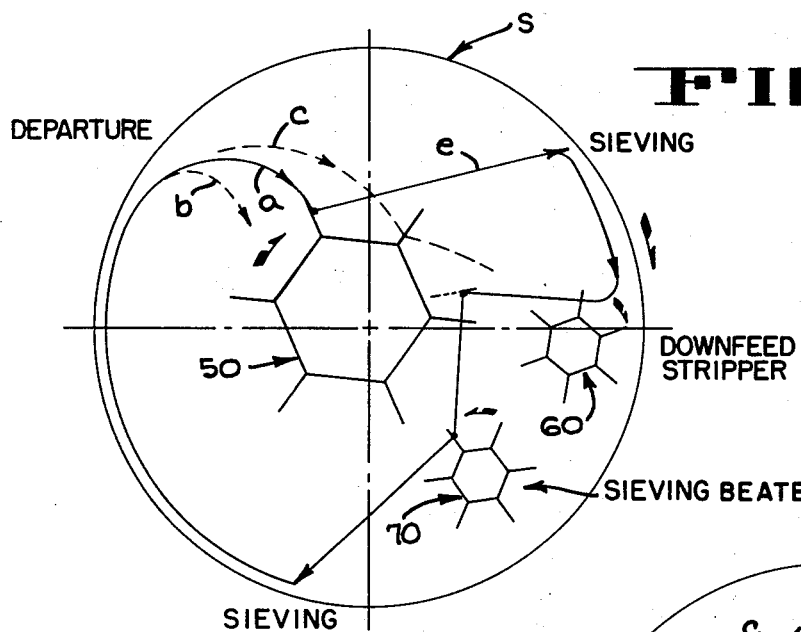
FIG_8
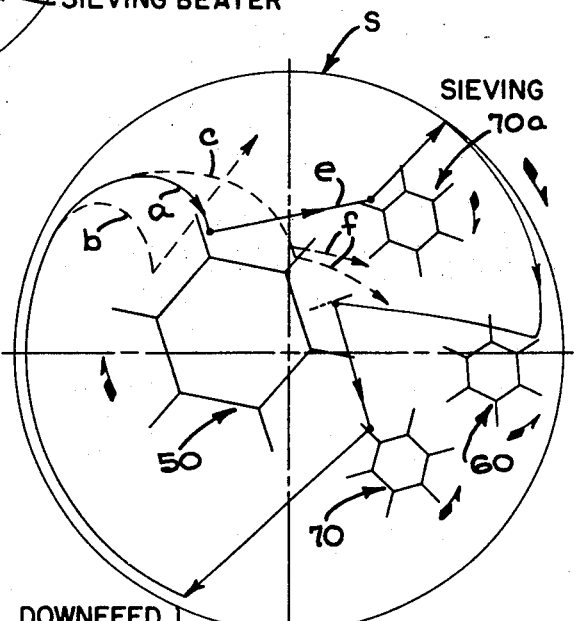
FIG_9
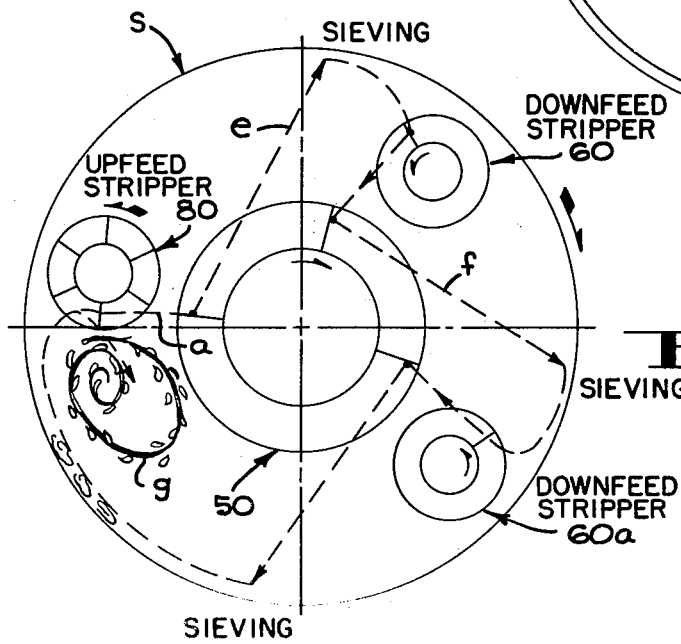
FIG_10

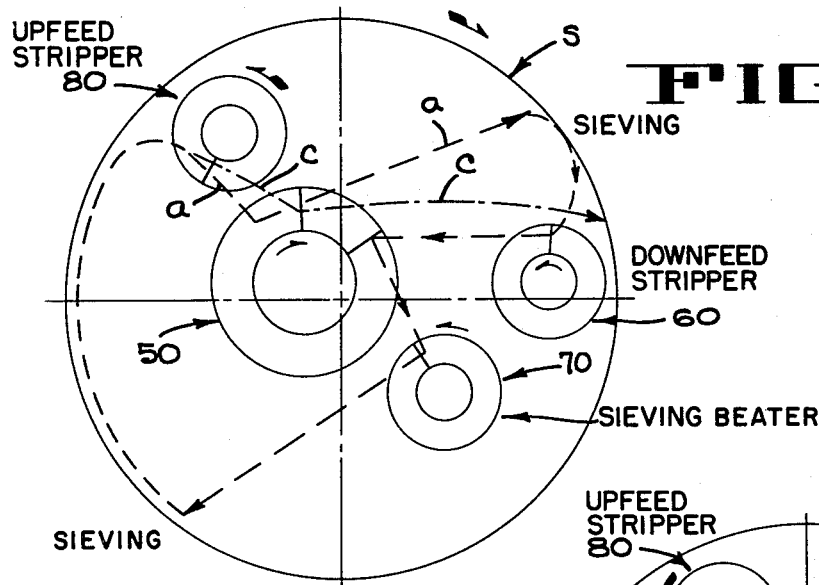
FIG_11
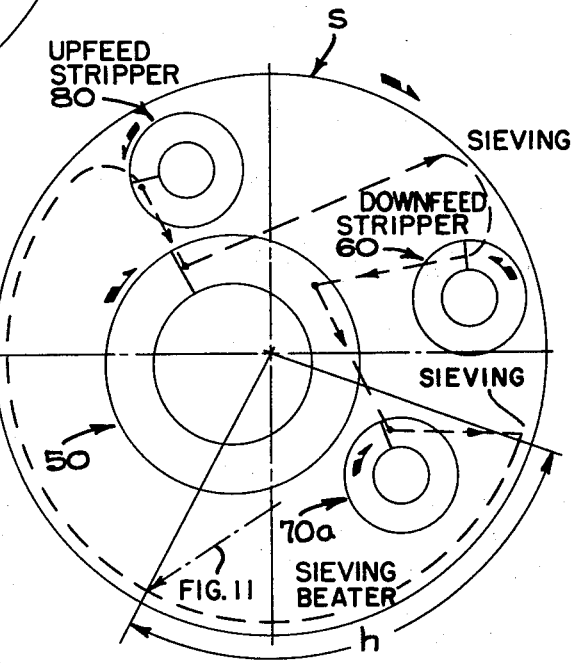
FIG_12
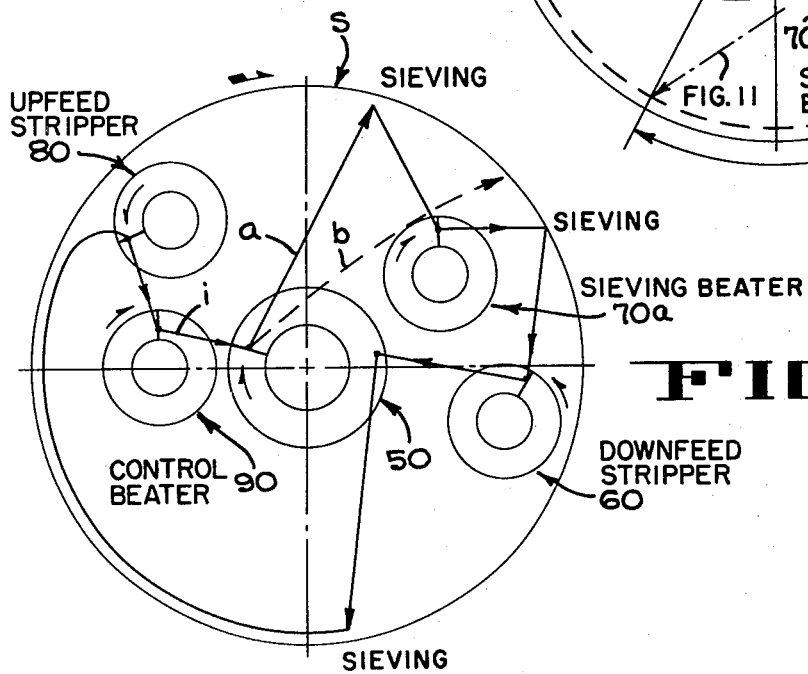
FIG_13

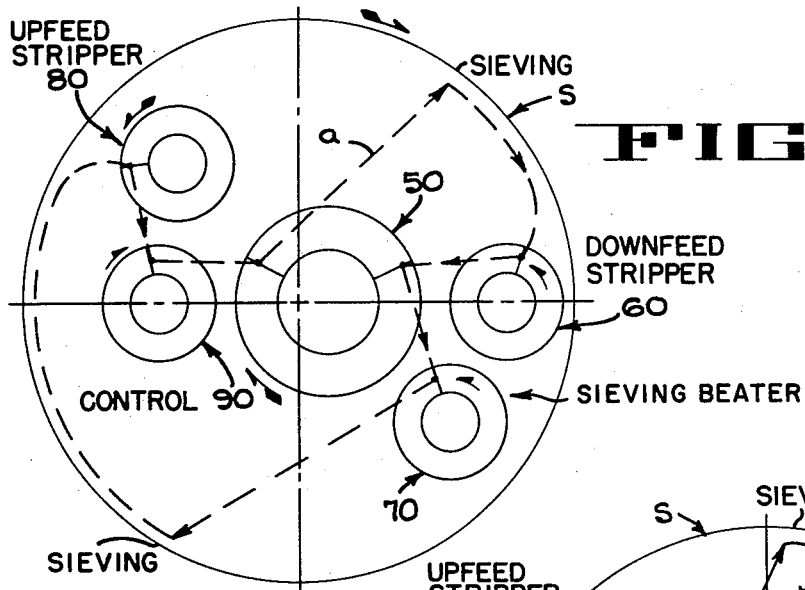
FIG_14
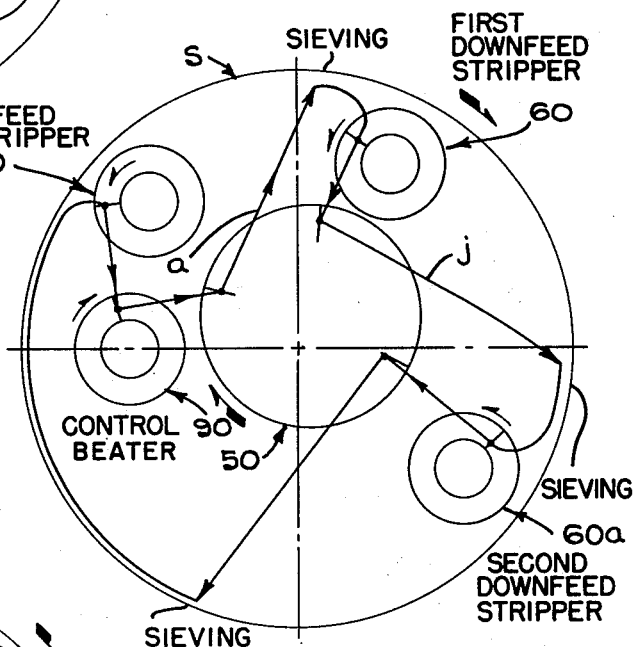
FIG_15
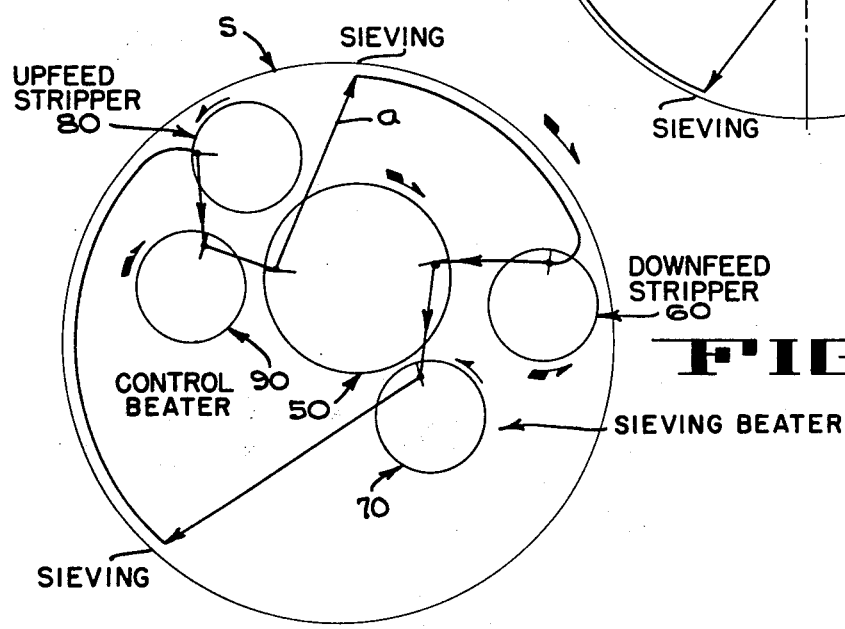
FIG_16

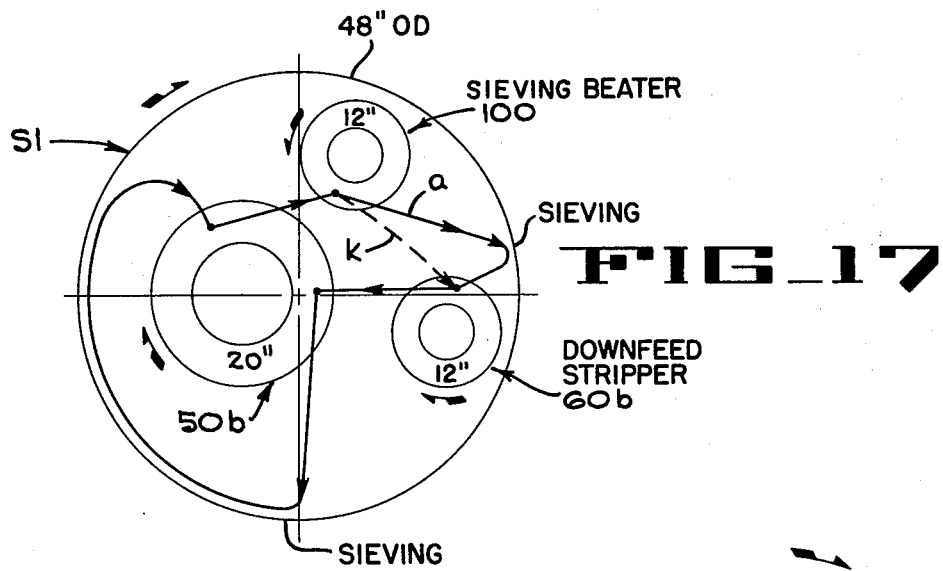
FIG_17
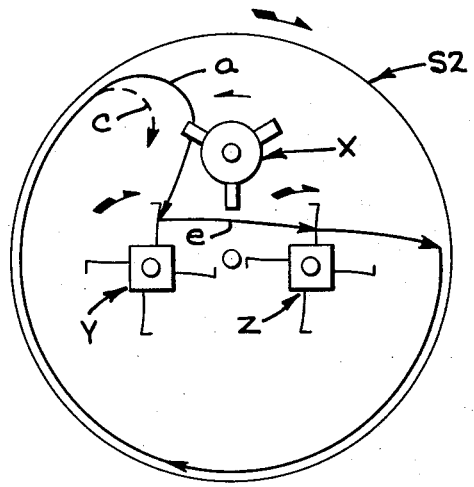
FIG_18
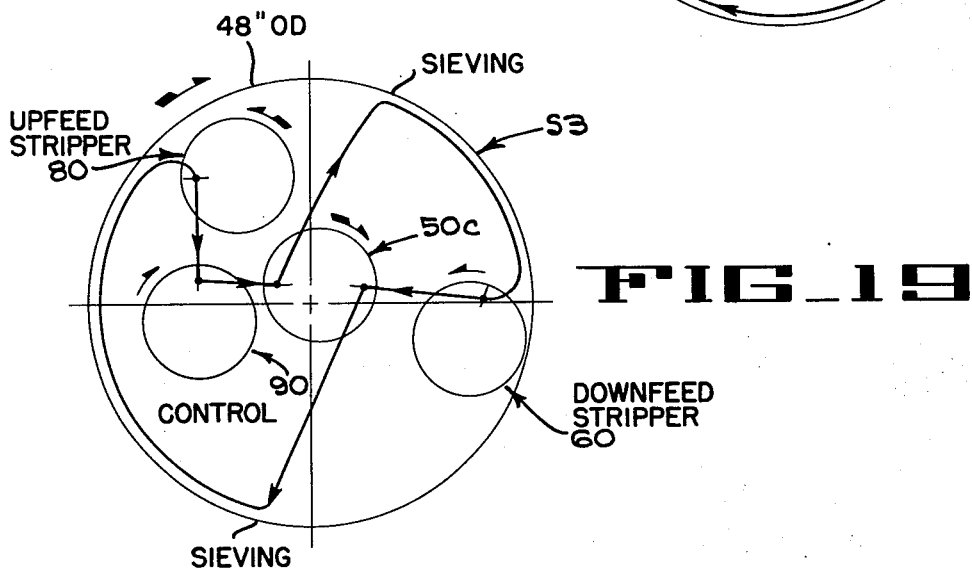
FIG_19

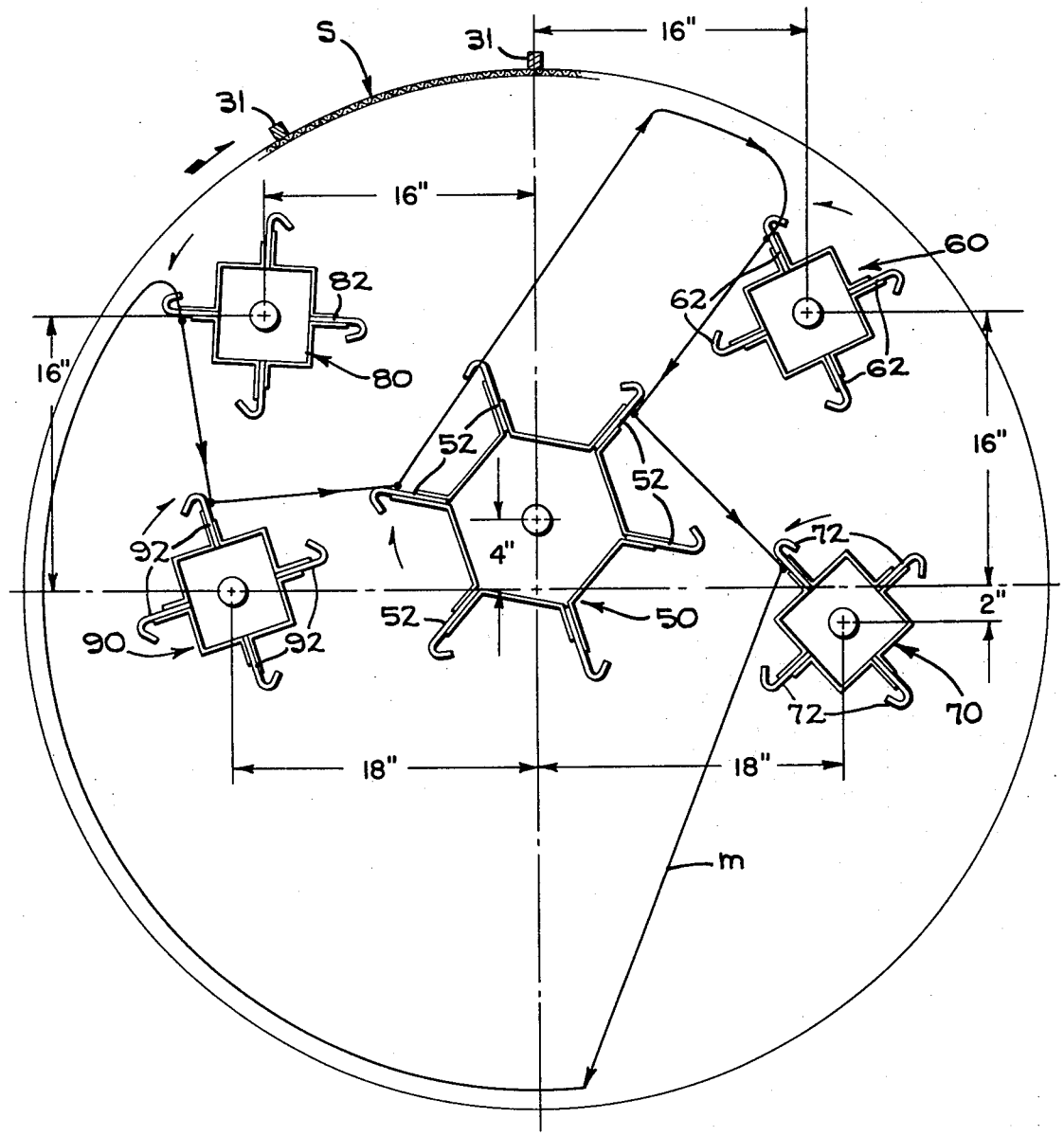
TYPICAL OPERATING RPM
| | SCREEN S 5' DIA. | BEATER 50 20" DIA. | BEATERS 60 & 80 12" DIA. | BEATER 70 12" DIA. | BEATER 90 12" DIA. |
|---|---|---|---|---|---|
| PEAS | 29-34 | 140-210 | 258-388 | 220-330 | 240-360 |
| LIMA BEANS | 29-34 | 200-280 | 370-519 | 314-440 | 343-480 |

MULTI-BEATER THRESHER

FIELD OF THE INVENTION

This invention relates to harvesters and will be illustrated and described as embodied in a field harvester for crops such as peas, beans or the like.

DESCRIPTION OF THE PRIOR ART

The patent to Pillmore et al. U.S. Pat. No. 728,759, May 19, 1903 discloses a pea hulling machine having a screen with internal ribs containing three identical, symmetrically disposed beaters. The beaters and the surrounding screen all rotate in the same direction.

The patent to Pillmore et al. U.S. Pat. No. 752,256, Feb. 16, 1904 shows a pea hulling machine like that of the earlier Pillmore et al. patent except that the beaters are conical and intermesh at their larger diameters.

The patent to Mather et al. U.S. Pat. No. 2,934,072, Apr. 26, 1960 discloses a pea and bean debodying machine having a central drum, a very large surrounding screen with a helical rib and 13 small beaters disposed between these elements. Adjacent beaters rotate in opposite directions for propelling the peas back and forth between the inner and outer drums.

It is known that in 1970 a self-propelled pea combine manufactured by Herbort of Germany was operated in that country. To the best of applicants' knowledge, this combine had a rotating reel or screen with internal ribs having three beaters of substantially the same size disposed in an upper portion of the reel. The beaters were disposed somewhat symmetrically and the two lower beaters rotated in the same direction as the screen, whereas the upper beater rotated oppositely thereto.

The patents to Burenga U.S. Pat. No. 3,351,200, Nov. 7, 1967 and Hammachek et al. U.S. Pat. No. 3,326,038, Nov. 22, 1966 are cited as examples of legume harvesters most representative of current commercial practice in the United States. Each of these harvesters has a single central beater within a relatively large rotating screen or reel.

SUMMARY OF THE INVENTION

The multi-beater thresher of the present invention will be illustrated and described as applied to a field harvester for vine crops such as beans, peas or the like. The principle objective features and advantages of the harvester of the present invention are as follows:

1. The harvester optimizes the yield or percent recovery while minimizing damage to the recovered crop. This advantage can be employed either to (a) increase machine threshing capacity for the same acceptable yield and damage to the peas or beans, or (b) increase the yield of prior devices with a much lower resultant damage to the crop, or (c) operate the machine at conditions intermediate to the above.

2. Provide a high threshing rate in the field; with the companion considerations of 3. Permitting use of a moderate size machine, e.g., one having a 4 or 5 foot diameter threshing screen or reel, while at the same time avoiding the need for an overly long screen.

4. Avoid complexities of construction while maintaining optimum yield of minimum damage. The optimum yield, minimum damage requirements are mentioned above.

More specific features of the present invention are as follows:

A. The general objectives mentioned above are accomplished in part by providing an adequate and clear infeed space for receiving crop fed into the lower section of the reel.

B. More impacts to the crop are provided without lengthening of the screen reel. This is accomplished by (a) removing ribs from inside the screen and replacing them with external reinforcements, (b) adding satellite beaters, the details of which will be described presently and each of which performs a different function.

The removal of the ribs from inside the screen in conjunction with satellite beaters of the present invention makes all of the screen accessible to impact by crops travelling from certain of the beaters without the shielding effect that would otherwise be provided by the ribs.

C. Another specific object and characteristic of the present invention is that of reducing the severity of the impacts. It has been found that by increasing the number of impacts, the threshing rate can be increased whereas by reducing their severity, the damage rate can be decreased. Under the present invention, in addition to using the satellite beaters as described above in conjunction with the main or central beater, these desirable results are further accomplished by collating the linear speeds of the central and satellite beaters taking into consideration the entering and leaving velocities of the crop relative to those beaters.

D. Another specific feature is to provide optimum utilization of the available space in the screen. Various aspects of this objective are the removal of crop as soon as possible from its motion along the upfeed side of the screen so that it soon enters the active (impact) portion of the threshing cycle. As will be seen, applicants found that this presented difficulties in a thresher of the type of the present invention. These difficulties were resolved by use of a properly positioned upfeed stripper beater disposed between the screen and the central beater.

Another aspect of attaining optimum utilization of the available screen area is the provision of properly positioned downfeed stripper beaters at the screen in a manner that gives more space for sieving and shortens the over-all threshing cycle time.

Still another feature of the present invention is that of accomplishing the upfeed stripping referred to above without causing the vines and crop to ball-up below the upfeed stripper beater. In the present invention ball-up is prevented by a properly placed and properly rotating control beater just below the upfeed stripper beater. The control beater actually receives the crop from the stripper beater and throws it into the central beater. This action is an important feature of the present invention.

E. Another specific object is to provide a sieving of the crop in an upper portion of the screen as well as in other portions. In the present invention this is accomplished by having the upfeed stripper beater relatively high in the screen so that the control beater (which receives the crop from the upfeed stripper beater) can be positioned to relay the crop onto the central beater at a relatively low position on the latter. With these conditions the central beater will provide a sieving trajectory toward the screen that is steeply inclined, that is, not too far off from the vertical. Hence the crop will strike the screen at a good aspect angle and there will be no interference by other beaters on the downfeed side of the screen to reduce the sieving action. Another advantage of the steeply inclined sieving trajectory from the central beater is that it makes the angle of entrance into the screen close to radial, hence provides an optimum sieving impact. Under the present invention this advantage is further obtained by not having a central beater with too large a diameter.

F. Another feature of the present invention is that of providing a downfeed stripping beater to return the crop from the screen after sieving from the central beater.

G. Another object is to provide at least one additional sieving at a lower part of the screen.

H. A characteristic of the preferred embodiment of the present invention is that the over-all harvesting operation is speeded up by minimizing the travel of vines on the screen after each sieving on the screen. This is done by placing the downfeed stripper beater a short distance from the sieving point and by placing a sieving beater at the downfeed side of the screen and below the downfeed stripping beater, and rotating the latter so that it throws vines across the lower part of the screen instead of letting the vines lay on the screen for a substantial distance around the lower part of the screen.

It is a feature of one form of the invention that three sievings are provided, one from the central beater using an upfeed stripper and control beater as described above and two from the central beater using downfeed stripper beaters on the downfeed side of the screen.

The manner in which these objects and advantages are obtained in several embodiments of the invention will be apparent in the following detailed description.

BRIEF DESCRIPTION OF THE DRAWINGS

FIG. 1 is a side view of a field harvester for peas or beans providing the threshing principles of the present invention.

FIG. 2 is a section of the harvester taken on line 2—2 of FIG. 1.

FIG. 3 is a graph showing the effect of beater speed on damage to the crop.

FIG. 4 is a graph showing the effect of beater speed on the shelling operation.

FIG. 5 is an enlarged diagrammatic section through a harvester showing a preliminary stage of development of preferred embodiments thereof.

FIG. 6 is a diagram of the harvester of FIG. 5 showing the trajectory of the crop during threshing.

FIG. 7 is a vector diagram of the harvester of FIGS. 5 and 6 showing how various basic velocities of trajectories are developed in the thresher.

FIG. 7A is an enlarged vector diagram showing the conditions at the central beater.

FIG. 7B is an enlarged vector diagram showing conditions at the stripper beater rotating at an undesirably high rpm.

FIG. 7C is a diagram like that of FIG. 7B showing the vector diagram of the stripper beater when the stripper beater is rotating at the desired rpm.

FIGS. 8–19 are small diagrams of various thresher constructions presented to show both inferior and good features and constructions of various developments in the beater arrangements. These data are presented in order to more clearly present guidelines for an understanding of how the advantages of the present invention can be obtained. These figures also include several of the most effective embodiments of the invention.

FIG. 20 is an enlarged section of one of the preferred beater arrangements showing construction, dimensions and placements of the parts.

DETAILED DESCRIPTION

General Description of a Harvester Embodying the Invention

FIGS. 1 and 2 show in simplified form and somewhat diagrammatic form a field legume harvester embodying the threshing system of the present invention. The details of the pickup, material handling conveyors or the like of the harvester are not critical to the present invention and reference is made to patents such as that of Slates et al. U.S. Pat. No. 3,408,802, Nov. 5, 1968 for disclosure of a type of harvester and pickup adaptable for use with the present invention.

Referring to FIGS. 1 and 2, a field harvester 10 for legume crops such as peas or beans is fitted with the threshing unit of the present invention. Harvesters of this type are in common use and the mechanical details thereof are not critical to the present invention and hence only the salient features of the harvester will be mentioned.

The harvester 10 has the usual frame indicated generally at 12, driven front wheels 14 and trailing rear wheels 16. The rear wheels 16 can be moved up and down in a conventional manner to adjust the fore and aft inclination of the harvester so that its inclination with respect to the horizontal can be maintained at the angle selected to insure flow of product through the threshing unit. Thus, the rear wheels 16 are mounted on trailing arms 18 pivoted to the frame at 20 and raised and lowered by vertical hydraulic cylinder assemblies 22. A cab and engine compartment 24 are provided and means (not shown) are also provided for driving the front wheels 14 and the various hydraulic pumps for the hydraulic motors that operate the hydraulic conveyors, beaters and other articles of equipment.

A pickup indicated generally at 26 is provided for removing the mass of vine and crops from the ground and introducing it into a elevator conveyor 28 that feeds the crop into the threshing unit 30 of the present invention. The details of the pickup are not critical to the present invention except for the fact that the crop is fed into a lower portion of the thresher 30, as best seen in FIG. 2. By way of example, the pickup shown in the aforesaid Slates et al. U.S. Pat. No. 3,408,802 is illustrated diagrammatically in FIG. 1, although other pickups and infeeds to the lower portion of the thresher 30 can be employed under the principles of the present invention.

As best seen in FIG. 2, the threshing unit 30 includes a large diameter rotating reel or screen indicated generally at S which screen has the usual coarse cloth or wire mesh netting having apertures in the order of three-fourths of an inch in accordance with conventional practice. One of the features of the present invention is that the screen does not have internal ribs but rather is reinforced by longitudinal ribs 31 disposed externally on the screen. The screen can be made in longitudinal sections fastened together, as in conventional practice.

In a harvester of the present invention, the screen S is surrounded by a shroud 32 (FIG. 2) having sides 33 and end plates 34, 36 (FIG. 1). Also, as is the usual practice, the screen is formed with circular tracks 37 (FIG. 2) that ride on support rollers 38 mounted on the frame 12 and are disposed to both support and locate the screen in the harvester. In order to rotate the screen, a belt 39 passes around a pulley on the screen and is driven by a hydraulic motor assembly 40. This, too, is conventional. Under the present invention various beaters are rotatable within the screen. The nature and disposition of these beaters, which is the subject matter of the invention, will be described in detail presently. At the moment it will be sufficient to indicate that, as seen in FIG. 2, the beater assembly includes a main or central beater 50 and satellite beaters 60, 70, 80 and 90, all of which have paddles. FIG. 2 shows how the infeed conveyor 28 directs the crop through an aperture in the front plate 34 of the screen housing and to a lower portion of the screen, below all of the beaters.

Some of the hydraulic motors for driving the beaters appear in FIG. 1. For example, as seen in FIG. 1 the beater 60 has a shaft 64 that is secured in the end plates 34, 36 and is driven by a hydraulic motor 66. Similarly the shaft 74 of the beater 70 is driven by a hydraulic motor 76. The other beaters are similarly mounted and driven. As mentioned, the pump and connections for the various hydraulic motors of these and other units to be described are not illustrated, it being understood that these represent conventional hydraulic practice.

During operation of the thresher the hulled crop (such as peas or beans) falls through the mesh of the screen S and is guided by the shroud 32 onto a laterally running belt 105 (FIG. 2). A upwardly running inclined belt 110 receives the hulled crop (and some trash) directly as well as from the belt 105. The belts 105, 110 are driven by hydraulic motors 106, 112 (FIG. 1).

The hulled crop slides back down on the belt 110 and the trash T is delivered out of the side of the machine from the upper end of the belt 110 beneath a windshield 114. The hulled crop P slides down from the belt 110 onto a longitudinally running belt 120 which is flanked by guide plates 124, 126. In the harvester illustrated the belt 120 delivers the crop rearwardly for further disposition by means not critical to the present invention and not illustrated.

During operation, as the vines work their way from the front or receiving end of the screen S to the rear end thereof and the vines and trash trapped within the screen are delivered to a rearward elevating conveyor 130 (FIG. 1) and hence are dropped back onto the field.

Beater Speed Considerations

As previously indicated in the introductory remarks of this specification, there were heretofore incompatible relations between the threshing effects and the damage to the product. For example, data for the graph of FIG. 3 was derived from the prior, conventional single beater large screen (drum) assembly illustrated diagrammatically at the right of the graph. In the graph, the relation between the "Equivalent Large Drum Beater Speed" in rpm and the "Percent of Mechanical Damage" to the product is given. For example, with a 5 foot screen diameter and a central beater having a diameter of 36 inches, the percent mechanical damage to the product varies from about three percent at 100 rpm of the drum to 16 percent at 160 rpm and increases rapidly to about 43 percent at 200 rpm.

The graph of FIG. 4 shows the effect of beater speed on shelling. Using the same abscissa of "Equivalent Large Drum Beater Speed" in rpm as in the graph of FIG. 3, the ordinate of FIG. 4 gives the "Number of Impacts to Shell All Peas" introduced into the screen. This curve shows that the number of impacts needed to shell all peas at low beater speeds is proportionally greater than that required to shell them at high beater speeds. However, as indicated in the graph of FIG. 3, high beater speeds increase the percent of damage to the crop rapidly.

As will be seen, in accordance with the present invention the number of impacts is increased thereby increasing the shelling rate without increasing the equivalent beater speed to a point wherein the percent mechanical damage is correspondingly increased. Thus with the present invention, and as compared to prior machines of the type with which we are concerned, a greater rate of shelling or threshing can be attained with a heretofore acceptable percent mechanical damage to the product. Alternatively, the mechanical damage to the product can be reduced while still maintaining a threshing rate equal to or greater than that previously obtainable.

Design Sequences

There follows a description of various thresher configurations which, as previously mentioned, are presented in order to facilitate better understanding of the development of the invention and the significance of the arrangements of the beaters therein. This presents guides to those skilled in the art for construction of threshers that embody the improvements of the present invention.

FIGS. 5–7 show early stages in the development of the invention but even these threshers have features of the preferred embodiments.

FIG. 5 shows a thresher wherein (as in all preferred embodiments) the screen S has no internal ribs but is externally reinforced at 31 as previously described. These ribs may be in dual, joined together form, if the screen is sectional, but these details of construction are unimportant and conventional. The outside diameter of the screen is 60 inches (5 feet). A central beater 50, having an outside diameter of 27 inches is mounted within the screen. A satellite beater 60 has a mode of operation which characterizes it as a "downfeed stripper beater." Below that is another satellite beater 70 having a function which characterizes it as a "sieving beater." The two satellite beaters in this form have an outside diameter of 13 inches and their positions within the screen S relative to its centerline are indicated by dimensions and angles given on FIG. 5. The directions of beater and screen rotation are also shown, it being noted that the central beater 50 rotates with the screen S, whereas the downfeed stripper beater 60 and the sieving beater 70 both have a direction of rotation contrary to that of the screen. The central beater 50 has six radial paddles 52 about 4–5 inches in radial dimension and the satellite beaters 60 and 70 have six radial paddles 62, 72 respectively, these having a radial dimension of about 2–2½ inches.

FIG. 6 is an operational diagram of the beater of FIG. 5 also indicating certain speeds of revolutions in the screen and of the beaters. The 32 rpm speed for the 5 foot screen is a typical operating speed of the harvester of the present invention and unless otherwise indicated the screens of the various forms being described are rotated at about that velocity. As mentioned, a prior, conventional type screen and beater or drum assembly is shown to the right of the graph of FIG. 3. In a typical prior assembly of this type, the screen has a diameter of 64 inches and rotates at 18 – 26 rpm whereas the single central beater has a diameter of 36 inches (the diameter at the periphery of the paddles) and rotates at 180 – 260 rpm.

The basic trajectory of the crop around the thresher is illustrated at dashed lines in FIG. 6. Of course, the crop has a steady, rearward axial progression, not illustrated. Beginning near the bottom of the screen, a sieving occurs at the screen. The remaining crop is carried on the upfeed side of the screen by friction with the action of centrifugal force until it reaches a point of departure from the screen which, in the example shown is at an angle alpha of about 28 degrees horizontal. The mass of vines and peas or beans then follows a curved trajectory until it strikes the large diameter central beater 50, which is rotating in a clockwise direction as viewed in FIG. 6. This produces "impact No. 1" and hence continues the threshing action. A certain percentage of the peas or beans are hulled at this and successive impacts. Crop then follows a generally lateral trajectory across the screen for another sieving impact with the screen. The crop then ricochets or may be partially carried down on the downfeed side of the screen to the beater 60 which imparts "impact No. 2" to the crop. In the form shown beater 60 is smaller than beater 50 and can be referred to as a "satellite" beater. The crop is now flung back to the central beater 50 where it undergoes "impact No. 3." The central beater next flings the crop down against the satellite beater 70 for "impact No. 4" and the latter flings it to the sieving position at the bottom of the screen from which this description started.

The beater 60 has been characterized as a down-feed stripper beater in FIG. 5. Its paddles 62 are relatively close to the inside of the screen S and it rotates in a direction opposite to that of a screen rotation. Thus, beater 60 insures that any crop which does not fall from the screen by gravity against the beater will be removed therefrom by its paddles and flung back to central beater 50 as shown in FIG. 6. Beater 70 has been termed a "sieving beater" in FIG. 5 for the reason that its mode of operation is to receive the crop and fling it, by means of its paddles 72, against the screen for a sieving operation. Of course, crop is hulled at each impact and may depart from the mass of vines, hulls and crop being propelled on the illustrated trajectories. Such hulled crop may emerge through the screen at other than the illustrated "sieving" zones.

Thus the unit of FIG. 6 provides four impacts of the crops with rotating beaters and two sieving impacts with the screen. In accordance with the principles of the present invention, since the number of impacts has been increased it should be possible to reduce the severity of those impacts and hence reduce mechanical damage to the crop without increasing the duration of the threshing operation.

Vector Diagrams

FIG. 7 shows a series of vector diagrams at the various impact points of the construction of FIGS. 5 and 6. However, in the threshing system of FIG. 7, the downfeed stripper beater 60 and the impact beater 70 are both rotating at 165 rpm, and hence have half the rotational speed of the corresponding beaters 60 and 70, previously described. Hence, the trajectory from beater 70 is somewhat different from that illustrated in FIG. 6.

The various vectors which describe the action of the beaters on the product are shown at the various impact points in FIG. 7, but not at the sieving points. These vectors are merely presented as a guide for assisting those skilled in the art to arrive at thresher constructions in accordance with the principles of the present invention. For example, at impact No. 1 wherein the product leaves the screen and strikes the central beater 50, the vector V1 represents the incoming velocity of the crop, but in the diagram its direction is reversed so that it can be considered to represent an equivalent situation wherein the beater paddle is moving against the crop in the direction of crop approach instead of the crop moving against the paddle. This is merely done in order to produce a less cluttered vector diagram. The small angle "y" is the angle of inclination of the incoming trajectory of the crop to a radial line at the point of impact. The solid line vector V2 represents the speed of the beater paddles at the point of impact. The resultant vector V3 represents what would be the equivalent velocity of the paddle relative to the crop if the crop were perfectly elastic. The small vector V4 represents the actual velocity of the paddle relative to the crop after impact. This vector is drawn in the correct direction, that is, the direction that would result if the incoming vector V1 were drawn down instead of up, for sake of convenience. The length of the vector V4 has arbitrarily assumed to be 0.3 times the length of the vector V3. This factor representing what might be termed the factor of restitution at the collision between the paddle and the crop. In other words, a perfectly elastic crop would have a coefficient of restitution of 1.0. The length of the vector V3 (and hence its counterpart V4) has been found under the present invention to be of significance. This vector represents the relative velocity of the paddle and the crop and hence is a major factor in determining mechanical damage imparted to the crop by the paddle. Under the present invention, it is desired to hold this vector to a value which is high enough to provide efficient threshing but yet low enough to hold down crop damage. As will be seen, another feature of the present invention is that the magnitude of the relative velocity vector V3 should be relatively uniform at all zones of impact because if that velocity is substantially increased at any impact, then the chances of damage are increased correspondingly, whereas if the same relative velocity were made too low in any one impact the effectiveness of that impact as a shelling operation would be correspondingly reduced.

The dotted line vector V5 at impact No. 1 represents the resultant velocity of the mass leaving the paddle relative to free space and also indicates the initial direction of a trajectory towards the screen for sieving in the construction being considered. Without going into detail, the vector diagrams like that at impact No. 1 are repeated at the impacts Nos. 2, 3 and 4 at the downfeed stripper beater 60, the central beater 50 and the sieving beater 70, to illustrate the advantages of reducing the peripheral speed of the beaters so that the velocity V3 (paddle velocity relative to the mass) is not allowed to substantially exceed the corresponding velocity V3 at the central beater 50.

Numerical examples of the vectors for impact No. 1 at the central beater 50 are shown in FIG. 7A. FIGS. 7B and 7C show comparative vectors at two velocities of the stripper beater 60 (impact No. 2). For example, as can be seen from the data of FIG. 7B, the velocity for the important relative velocity V3 in question is 25.95 feet per second, when the stripper beater 60 is rotated at 330 rpm. As indicated in FIG. 7C, when the stripper beater 60 is rotated at only 165 rpm, the critical relative velocity V3 becomes 19.70 feet per second and hence compares closely with the corresponding velocity V3 of 16.75 feet per second (FIG. 7A) at the central beater 50. Thus, by analysis as described and illustrated graphically in FIGS. 7A to 7C, all of the vectors of FIG. 7 can be determined.

Referring back to FIG. 7A by way of additional explanation, this is an enlarged view of the vector diagram at impact No. 1 with the central beater 50, giving additional information as to the incoming velocities of the mass in the vertical and horizontal directions. These are velocities Vv and Vh, which are the vertical and horizontal components of the incoming velocity V1. It will be noticed in FIG. 7A that the angle "a" of the velocity of the paddle relative to the mass in the construction vector V3 is assumed to be the same as the angle "d" of the velocity V4 which is the actual corrected related velocity of the paddle relative to the mass, but drawn in the proper direction. These angles are measured from the direction of motion of the paddle, vector V2. Also, referring back to FIGS. 7B and 7C, these vector diagrams at the satellite beater 60 illustrate velocity determinations in a manner which causes the relative velocity V3 of the paddle and the crop to not only be at a low enough value to avoid damage but high enough to maintain threshing (FIG. 7C), and FIG. 7 shows the vector V3 to be of the same degree of magnitude all around the thresher, thereby providing optimum conditions between these two incompatible factors.

BEATER CONFIGURATIONS

The diagram of FIG. 8 illustrates one of the difficulties that can be encountered with the threshing assembly of FIGS. 5–7 just described. It has been found that the point of departure of the crop from the screen S and the velocity of the departing crop from the screen will vary in accordance with variations in velocity of rotations of the screen and will also be affected by adhesion conditions between the crop and the screen. Thus, to make the threshing arrangement described operate consistently would require both the close control of the screen rpm and careful maintenance of conditions within the screen. As a result, it has been found that in addition to the idealized trajectory "a" of the crop to the central beater 50, previously shown in FIGS. 5–7 and repeated in FIG. 8, departure trajectories such as those indicated at "b" and "c" occur. These variations in the impact direction at the central beater 50 cause deviations from the idealized departure (sieving) trajectory "e" leaving that beater and hence may not provide the optimum results theoretically obtainable by the beater configuration of FIG. 8.

In the design of FIG. 9, attempts were made to accommodate the variations in the departure trajectory from the central beater 50. This was to be accomplished by introducing a rotating sieving beater 70a in the general path "e" of rebound of the crop from the central beater 50. However, even with this addition, the aforesaid variations in the incoming trajectories "b" and "c" previously described in connection with FIG. 8 resulted in variations in rebound paths from the central beater such that the sieving beater 70a was not effective during all portions of a harvesting operation, because trajectories such as "f" missed the beater 70a. Hence the form of FIG. 9 could not be considered to correct the difficulties with FIG. 8 previously described.

FIG. 10 shows an initial stage in what eventually resulted in a successful design for accommodating variations in the departure trajectory leading to the first impact at the central beater 50. In this construction a counter-rotating, upfeed stripper beater 80 was added. This beater had (for example) six paddles and was disposed close enough to the inner periphery of the screen S to strip the crop from the screen and fling it laterally into the central beater 50. In the construction of FIG. 10 the crop was to enter the central beater 50 at a lower zone than before (compare with FIGS. 8 and 9) with the result that the sieving trajectory "e" should be steeply inclined, that is, it would not represent much of a departure from the vertical. This, in turn, provides room in the upper portion of the screen for a downfeed stripper beater 60 which strips the product from the screen soon after it passes the vertical centerline of the screen and relays the product back to the central beater 50. As a result, still another sieving operation is attained from trajectory "f," whereupon the crop is again stripped from the screen by a downfeed stripper beater 60a that relays it back to the central beater a second time for the final sieving near the bottom of the screen.

However, it was found that the idealized trajectory "a" of FIG. 10 (just described) was not attainable over a prolonged period of operation, because the crop would begin to ball up beneath the upfeed stripper beater 80 as shown diagrammatically at "g." This resulted in clogging or partial clogging of the screen and reduction in threshing efficiency.

The construction of FIG. 11 represents an unsuccessful attempt to correct all the difficulties that took place at the upfeed stripper beater 80, the principle change being that the upfeed stripper beater 80 was raised higher within the screen. Although this construction did, to a large extent, reduce the ball-up conditions, described in connection with FIG. 10, the irregular departure trajectory problem first described in connection with FIG. 8 remained troublesome. For example, instead of the idealized trajectory shown at "a" in FIG.

11, wherein the crop was given a sieving trajectory from the central beater 50 and then picked up by the downfeed stripper beater 60 and later by a contrarotating sieving beater 70, as described in connection with FIG. 8, some of the trajectories attained were like those indicated at "c" in FIG. 11. Due to the variations in the departure trajectory into the central beater 50, the crop came into the central beater on a trajectory "c" that was too horizontal, the result being that the rebound trajectory "c" from the central beater entered the downfeed stripper beater 60 instead of providing an effective sieving action along the intended rebound trajectory "a." Thus, although the design of FIG. 11 reduced the ball-up problems characteristic of FIG. 10, the other beaters were not fully utilized.

The construction of FIG. 12 represents another attempt to solve the problem of feeding the central beater 50 unsuccessfully solved in FIGS. 9–11. Here, the central beater 50 has a larger diameter than before and is disposed so that the sieving trajectory from the central beater 50 toward the screen misses the beater 60. Although this construction was somewhat better than that of FIG. 11 it is still erratic for the same reasons and is not considered to be fully satisfactory.

FIG. 12 also illustrates another less than desirable construction, namely, the lower sieving beater 70a has its direction of rotation reversed so that it turns with the screen S. The difficulty with this construction is that upon receiving the crop from the central beater 50, the lower sieving beater 70a propels the crop almost horizontally towards a downturning side of the screen. The sieving trajectory of FIG. 11 is drawn in FIG. 12 in broken lines and it can be seen that there is an arc of travel in the crop on the screen indicated at "h." This represents increased non-threshing travel time of the crop with screen and hence delays the return of the crop to the upfeed stripper beater 80. This increases the over-all threshing time of the installation.

FIG. 13 illustrates a construction that successfully solved both the departure trajectory variation problems of FIGS. 8 and 9 and the ball-up problem beneath the upfeed stripper beater 80 of FIG. 10.

In FIG. 13, these problems are solved by the introduction of a beater having a new function, namely, a control beater 90. The control beater 90 is disposed just below the upfeed stripper beater but is spaced far enough away from the inner periphery of the screen S that it does not perform a stripping action. It rotates with the screen and receives material flung downwardly from the upfeed stripper 80. The control beater 90 immediately relays the material laterally to the central beater 50 along a trajectory "i." Beaters arranged in accordance with the principles of this mode of operation were found to function reliably over the variable field conditions normally encountered.

In the construction of FIG. 13 an upper sieving beater 70a is also illustrated which can be considered to correspond to the sieving beater 70a discussed in connection with FIG. 9. Although most of the trajectories were like the idealized trajectory "a" shown wherein the central beater 50 flung the crop to an upper portion of the screen for sieving and the crop again rebounded from the screen to the upper sieving beater 70a, the use of a sieving beater in this upper location was not completely successful. The reason for the failure in this regard lies in the fact that some of the trajectories of the crop formed from the central beater 50 were too flat, as indicated at "b," and instead of impinging directly on the screen for sieving, would enter the sieving beater 70a thus eliminating the intended upper sieving action at the screen. This less than optimum use of the sieving beater 70a does not, however, detract from the effectiveness of the combination of the upfeed stripper beater 80 and the control beater 90 previously explained.

The construction of FIG. 14 illustrates one of the final developments of a thresher embodying the present invention, particularly with what might be termed a large reel or screen, that is one having an internal diameter of about 5 feet. In this construction an upfeed stripper beater 80 and a control beater 90 are disposed in accordance with the principles previously discussed with FIG. 13. Instead of providing an upper sieving beater 70a as in FIGS. 9 and 13, a downfeed stripper beater 60 is disposed near the horizontal centerline of the thresher, and a low sieving beater 70 is also provided generally in accordance with the principles of the designs previously described in connection with FIGS. 8, 9 and 11.

The sieving beater 70 throws the crop to the screen for sieving on the upfeed side of the screen, and the advantages of this type of sieving as compared to the type shown in FIG. 12 in terms of shortening the cycle have been previously explained. A thresher having the function and mode of operation of that shown in FIG. 14, with the beater speeds adjusted so that the relative velocities of the beater paddles relative to the crop are not too high and are generally the same throughout the threshing cycle represents a significant improvement over prior known devices of this type. The number of impacts is increased and damage to the crops is decreased, the result being a higher yield with less damage and greater threshing capacity than any threshers of this type heretofore known.

FIG. 15 illustrates another successful construction. In the beater disposition of FIG. 15, the upfeed stripper and control beaters 80, 90 both provide threshing impacts and feed the crop to the central beater 50 with uniformity and regularity. In the construction of FIG. 15, the central beater 50 is of a larger diameter than in that of FIG. 14 (about 24 inches instead of 20 inches as before), and as a result of this and the relative placement of the beaters the material flung to the central beater from the control beater 90 comes in at such an angle that the trajectory "a" of the material leaving the central beater more closely approaches the vertical than does the corresponding trajectory "a" in the construction of FIG. 14. This makes it possible to move the downfeed stripper beater 60 to a position higher up in the screen (as compared to FIG. 14) for stripping the material from the screen soon after the sieving operation from trajectory "a." As a result of the space thus gained, a second sieving trajectory "j" can now be initiated by the central beater before the material is removed from the screen again by a second downfeed stripper beater 60a. Although the successful construction of FIG. 14 provides six impacts and two sieving operations and that of FIG. 15 provides seven impacts and three sieving operations it has been found in practice that both constructions are highly effective and both represent substantial improvements over the prior art.

The construction of FIG. 16 represents a modification of that of FIG. 14 and has the same basic trajectory. However, in the FIG. 16 construction the upfeed stripper beater 80 and the control beater 90 are at higher positions in the screen and the central beater 50 is also higher than in FIG. 14. The result of the arrangement illustrated is that the sieving trajectory "a" from the central beater 50 is more vertical than that of FIG. 14. To some extent the more nearly vertical sieving impact on the upper face of the screen optimizes the effect of the sieving impact. In the construction of FIG. 16, the downfeed stripper beater 60 and the sieving beater 70 have modes of operation substantially like that of the corresponding beaters in FIG. 14.

A general characteristic of the construction heretofore described has been the screen S has a 5 foot (60 inch O.D.) diameter and the central beater has an outside (paddle) diameter of 20 inches (24 inches in FIG. 15) and the satellite beaters have an outside (paddle) diameter of 12 inches. We have also investigated the possibilities of using a 4 foot diameter screen or reel S1, and such a construction appears in FIG. 17.

In the construction shown in FIG. 17, only three beaters are employed. The beater 50b corresponds to the prior central beaters 50 and has a 20 inch outside diameter. It is placed closer to the upfeed side of the screen than in prior designs. The larger beater 50b receives material directly from the screen S1 and relays it to a sieving beater 100 intended to perform a sieving operation at the screen along the basic trajectory "a." A downfeed stripper beater 60b receives the material from the screen and flings it back to the large beater 50b which now propels the material towards the lower portion of the screen for a second sieving operation. It has been found in the operation of this construction that the basic sieving trajectory "a" from the sieving beater 100 to the screen was not uniform and could take the path indicated at "k." Thus the material, instead of undergoing the first sieving operation was merely propelled into the downfeed stripper 60b thereby reducing the effectiveness of the over-all threshing configuration.

FIG. 18 represents a construction having three beaters of substantially uniform size and somewhat symmetrically arranged in the screen S2. In this construction a contra-rotating beater "x" on the vertical axis receives the material from the screen and relays it to a beater "y" which is symmetrically disposed with respect to the screen center relative to a second beater "z." The beater "x" turns contrary to screen rotation whereas beater "y" turns with the screen and hence passes the material on to the beater "z" rotating in the same direction. The latter passes the material back to the screen for sieving. This design would provide erratic action from the departure point at the screen to the beater "x" along trajectory "a," trajectories such as "c" occurring as previously explained with the configuration of FIG. 18. Hence the design of FIG. 18 is inherently not effective. For example, the action after the material leaves beater "y" along trajectory "e" is one of merely flinging the material into the paddles of the beater "z," these paddles moving in the direction of the received material. This results in little contribution of the beater "z" to the over-all threshing operation. This construction resembles that of the aforesaid German Herbort machine except that in the construction of FIG. 18 shielding of the crop by internal ribs on the screen would be absent because those ribs have been omitted.

The construction of FIG. 19 shows a successful design employing a 48 inch O.D. screen S3. In this construction, a central beater 50c and three satellite beaters are provided. However, the central beater 50c has a 12 inch diameter as do the upfeed stripper beater 80, the control beater 90 and the downfeed stripper beater 60. There is no room for a satellite sieving beater such as beater 70 in FIGS. 14 and 16, nor for a second downfeed stripper beater such as beater 60a in FIG. 15. The trajectory of the crop is illustrated in FIG. 19 and the results are as good as believed obtainable with a smaller diameter screen.

The principle of having the speeds of the beaters adjusted so that the relative velocity of the paddles and the mass at the points of impact with the beaters are substantially uniform throughout the threshing cycle; that is, impacts are high enough to give a good shelling action but yet not too high to provide mechanical damage, is to be applied to the construction of FIG. 19 in accordance with the principles previously described.

FIG. 20 is an enlarged section of the beater embodying one of the more successful constructions heretofore tested. The construction of FIG. 20 has a mode of operation that resembles that of FIGS. 14 and 16. The dimensions and locations of the beaters are indicated on the figure, as well as their preferred velocities of rotation. The material is picked off the upfeed side of the screen S by the paddles 82 of a four paddle upfeed stripper beater 80 and is flung to the paddles 92 of a four paddle control beater 90. The control beater 90 flings the material low into the 20 inch diameter central beater 50 and the paddles 52 of the latter fling the material on a steep upward path against the screen for sieving. The central beater 50 is on the vertical centerline of the screen. A downfeed stripper beater 60 is disposed higher in the screen than in the comparable construction of FIGS. 14 and 16. In this respect the configuration of FIG. 20 resembles that of FIG. 15. The material is thus flung back to the central beater a second time by the beater 60 as in FIGS. 14, 15 and 16. The central beater 50, as in the construction of FIGS. 14 and 16 throws the material to a sieving beater 70. The latter propels the material down to a lower portion of the screen S for the final sieving operation after which the material is again carried up for removal by the upfeed stripper beater 80. The beaters 50 and 70 are so disposed so that the sieving trajectory "m" is more nearly vertical than in the comparable designs of FIGS. 14 and 16.

FIG. 20 also includes a table listing the preferred range of beater speeds for harvesting both peas and lima beans.

Thus it will be seen that by judically mounting a plurality of beaters that rotate in certain relative directions in accordance with the principles explained above, substantial improvement can be made in threshing capabilities without increasing product damage, and without danger of plugging or ball-up of vines or the like inside the thresher screen.

Although the best mode contemplated for carrying out the present invention has been herein shown and described, it will be apparent that modification and variation may be made without departing from what is regarded to be the subject matter of the invention.

We claim:

1. A thresher for a legume crop mass comprising a large diameter, generally horizontal rotating screen, a generally centralized beater in said screen having paddles of substantial radial dimension and rotating in the direction of screen rotation, a plurality of satellite beaters between said centralized beater and the screen, and means for driving all of said beaters at a substantially higher RPM than that imparted to said screen, means for supplying the mass to a lower portion of said screen with said screen carrying the mass to an upper ascending portion of the screen without satellite beater interference, means for flinging the mass from said upper ascending portion of said screen to the near, upwardly ascending side of said generally centralized beater, with the paddles on the latter flinging the mass directly to an upper descending portion of the screen for sieving and without satellite beater interference, a downfeed stripper satellite beater having paddles rotating oppositely to said screen for again receiving the mass from the screen and flinging it back to said generally centralized beater without satellite beater interference, and means for thereafter flinging said mass back to a lower portion of said screen for sieving, said mass being thereafter carried up by said screen to its upper ascending portion without satellite beater interference.

2. The thresher of claim 1, wherein the interior of said screen is substantially devoid of beater ribs.

3. The thresher of claim 2, wherein said means for flinging the mass from an upper ascending portion of the screen to said generally centralized beater comprises an upfeed stripper satellite beater between the screen and said generally centralized beater and having paddles adjacent the screen that rotate oppositely to said screen.

4. The thresher of claim 3, comprising a control satellite beater below said upfeed stripper beater and having paddles spaced from the screen and rotating in the direction of screen rotation for receiving the mass from said upfeed stripper beater and flinging it into said generally centralized beater.

5. The thresher of claim 4, wherein the beater approach angles and the peripheral velocities of all of said beaters are such that the impact velocities of the beater paddles relative to the mass are substantially the same.

6. A thresher for a legume vine mass comprising a large diameter, generally horizontal rotating screen that is substantially devoid of internal beater ribs, a generally centralized beater in said screen having paddles of substantial radial dimension and rotating in the direction of screen rotation, and an array of satellite beaters between said centralized beater and the screen, and means for driving all of said beaters at a substantially higher RPM than that imparted to said screen, means for supplying the mass to a lower portion of said screen, said mass being carried up by said screen without beater interference, said array of satellite beaters consisting of an upfeed stripper satellite beater between an upper ascending portion of the screen and said generally centralized beater and having paddles adjacent the screen and rotating oppositely thereto for removing the ascending mass from the screen, a control satellite beater below said upfeed stripper beater and having paddles rotating in the direction of screen rotation and spaced from the screen for receiving the mass from said upfeed stripper beater and flinging it to the near side of said generally centralized beater, said latter beater flinging the mass directly to an upper descending portion of the screen for sieving, a downfeed stripper satellite beater rotating at a descending portion of the screen and turning oppositely to said screen for again removing the mass from the screen and flinging it directly back to said generally centralized beater, and a satellite beater below said downfeed stripper beater and turning oppositely to the direction of screen rotation for flinging said mass back for ultimate redelivery to a lower portion of said screen for sieving after the mass has again been flung by said generally centralized beater, said mass being thereafter carried up by said screen to said upfeed stripper.

7. The thresher of claim 6, wherein the beater approach angles and the peripheral velocities of said beaters are such that the impact velocities of all of the beater paddles relative to the mass are substantially the same.

8. The thresher of claim 6, wherein said last named satellite beater is a sieving beater that receives the mass directly from said generally centralized beater and flings it directly to the lower portions of the screen.

9. The thresher of claim 6, wherein said last named satellite beater is a second downfeed stripper beater below the screen axis that removes the mass from the screen and flings it back directly to said generally centralized beater, said latter beater flinging the mass directly to a lower portion of the screen.

10. The thresher of claim 9, wherein said downfeed stripper beaters have their axes at about the one and the four o'clock positions of the screen when the latter appears to be rotating clockwise.

11. The thresher of claim 6, wherein said centralized beater is formed with about six paddles and the other beaters are formed with about four paddles.

12. A thresher for a legume crop mass comprising a large diameter, generally horizontal rotating screen wherein the interior of said screen is substantially devoid of ribs, a generally centralized beater in said screen having paddles and rotating in the direction of screen rotation, means for feeding the mass to a lower portion of said screen without beater interference, means for causing the mass to thereafter move from an upper ascending portion of said screen to the near side of said generally centralized beater, (said latter means comprising an upfeed stripper beater between the screen and said generally centralized beater) and having paddles rotating oppositely to said screen and a control beater below said upfeed stripper beater and having paddles rotating in the direction of screen rotation for receiving the mass from said upfeed stripper beater and flinging it into said generally centralized beater, means on the centralized beater for flinging the mass to an upper descending portion of the screen for sieving, a downfeed stripper beater having paddles rotating oppositely to said screen for again receiving the mass from the screen and flinging it back to said generally centralized beater, and means for thereafter flinging said mass back to a lower portion of said screen, said mass being thereafter carried up by said screen to its upper ascending portion without beater interference, the beater approach angles and the peripheral velocities of said beaters being such that the impact velocities of the beater paddles relative to the mass are substantially the same, said peripheral velocities of the paddles relative to the mass being about 15 – 30 ft/sec.

13. The thresher of claim 12, wherein said screen has a diameter of about 4 – 5 feet, a peripheral velocity of about 7 – 9 ft/sec., said generally centralized beater has a diameter of about 17 – 24 inches and the other beaters have a diameter of about 12 inches.

14. A thresher for a legume vine mass comprising a large diameter, generally horizontal rotating screen that is substantially devoid of internal ribs, a generally centralized beater in said screen and having paddles rotating in the direction of screen rotation, means for feeding the mass to a lower portion of said screen, said mass being carried up by said screen without beater interference, an upfeed stripper beater between an ascending portion of the screen and said generally centralized beater and having paddles rotating oppositely to said screen for removing the mass from the screen, a control beater below said upfeed stripper beater and having paddles rotating in the direction of screen rotation for receiving the mass from said upfeed stripper beater and flinging it to the near side of said generally centralized beater, said latter beater flinging the mass to an upper descending portion of the screen for sieving, a downfeed stripper beater rotating at a descending portion of the screen and turning oppositely to said screen for again removing the mass from the screen and flinging it back to said generally centralized beater, and a sieving beater below said downfeed stripper beater and turning oppositely to the direction of screen rotation for receiving the mass from said generally centralized beater and flinging said mass back to a lower portion of said screen for sieving, said mass being thereafter carried up by said screen to said upfeed stripper beater without beater interference, the beater approach angles and the peripheral velocities of said beaters being such that the impact velocities of the beater paddles relative to the mass are substantially the same, said peripheral velocity of beater paddles relative to the mass is about 15 – 30 ft/sec.

15. The thresher of claim 14, wherein the diameter of said screen is about 5 feet, its peripheral velocity is about 7 – 9 ft/sec., said generally centralized beater has a diameter of about 20 inches and turns at about 140 – 280 RPM, the other beaters have a diameter of about 12 inches with the stripper beaters turning at about 260 – 520 RPM and the control and sieving beaters turning at about 220 – 480 RPM.

16. The thresher of claim 14, wherein said control beater has its axis at about the 9 o'clock position of the screen axis when the latter appears to be rotating clockwise.

17. The thresher of claim 16, wherein said downfeed stripper beater has its axis at about the 2 o'clock position on the screen.

18. A thresher for a legume vine mass comprising a large diameter, generally horizontal rotating screen that is substantially devoid of internal ribs, a generally centralized beater in said screen and rotating in the direction of screen rotation, means for feeding the mass to a lower portion of said screen, said mass being carried up by said screen without beater interference, an upfeed stripper beater between an ascending portion of the screen and said generally centralized beater and rotating oppositely to said screen for removing the mass from the screen, a control beater below said upfeed stripper beater and rotating in the direction of screen rotation for receiving the mass from said upfeed stripper beater and flinging it to the near side of said generally centralized beater, said latter beater flinging the mass to the top of the screen for sieving, a first downfeed stripper beater rotating at an upper descending portion of the screen and turning oppositely to said screen for again removing the mass from the screen and flinging it back to said generally centralized beater, said generally centralized beater thereupon flinging the mass back to the screen for sieving, and a second downfeed stripper beater below the screen axis and turning oppositely to the direction of screen rotation for removing the mass from the screen and returning it to said generally centralized beater, said latter beater thereupon flinging said mass back to a lower portion of said screen for sieving, said mass being thereafter carried up by said screen to said upfeed stripper beater without beater interference, the beater approach angles and the peripheral velocities of said beaters are such that the impact velocities of the beater paddles relative to the mass are substantially the same, said peripheral velocities of beater paddles relative to the mass are about 15 – 30 ft/sec.

19. The thresher of claim 18, wherein the diameter of said screen is about 5 feet, its peripheral velocity is about 7 – 9 ft/sec., said generally centralized beater has a diameter of about 24 inches and turns at about 115 – 230 RPM, the other beaters have a diameter of about 12 inches with the stripper beaters turning at about 260 – 520 RPM and the control beater turning at about 240 – 480 RPM.

* * * * *